United States Patent
Grgic

(10) Patent No.: US 10,012,979 B2
(45) Date of Patent: Jul. 3, 2018

(54) EMULATED INDUSTRIAL CONTROL EXECUTION RATE SCALING

(71) Applicant: Rockwell Automation Technologies, Inc., Mayfield, OH (US)

(72) Inventor: Richard J. Grgic, Painesville, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 315 days.

(21) Appl. No.: 15/001,460

(22) Filed: Jan. 20, 2016

(65) Prior Publication Data

US 2017/0205811 A1    Jul. 20, 2017

(51) Int. Cl.
    *G05B 19/418*    (2006.01)
(52) U.S. Cl.
    CPC .......... *G05B 19/41835* (2013.01); *G05B 2219/33139* (2013.01)
(58) Field of Classification Search
    CPC .............. G05B 19/4183; G05B 19/41835
    See application file for complete search history.

(56) References Cited

U.S. PATENT DOCUMENTS 6,496,848 B1 * 12/2002 Nankaku ............ G05B 19/4155
                                                718/100

FOREIGN PATENT DOCUMENTS

| DE | 102008030163 A1 | 12/2009 |
|---|---|---|
| EP | 2687928 A1 | 1/2014 |
| WO | 2015124170 A1 | 8/2015 |

OTHER PUBLICATIONS

European Search Report of Application No. 17151224.7; dated May 12, 2017.

* cited by examiner

*Primary Examiner* — Quoc Hoang
(74) *Attorney, Agent, or Firm* — Boyle Fredrickson, SC

(57) ABSTRACT

A host system which executes an emulation environment for modelling a logical behavior of an industrial control device may execute a clock management module to scale execution time in the emulation environment to more accurately reflect execution time of the industrial control device. The clock management module may operate to receive repeatable ticks based on a real time clock of the host system. The repeatable ticks may be used to measure execution of a portion of an industrial control program in the emulation environment, which measure may be compared to a reference value for executing the same portion on the industrial control device. The host system may then temporarily stall execution in the emulation environment to match execution on the industrial control device.

20 Claims, 5 Drawing Sheets

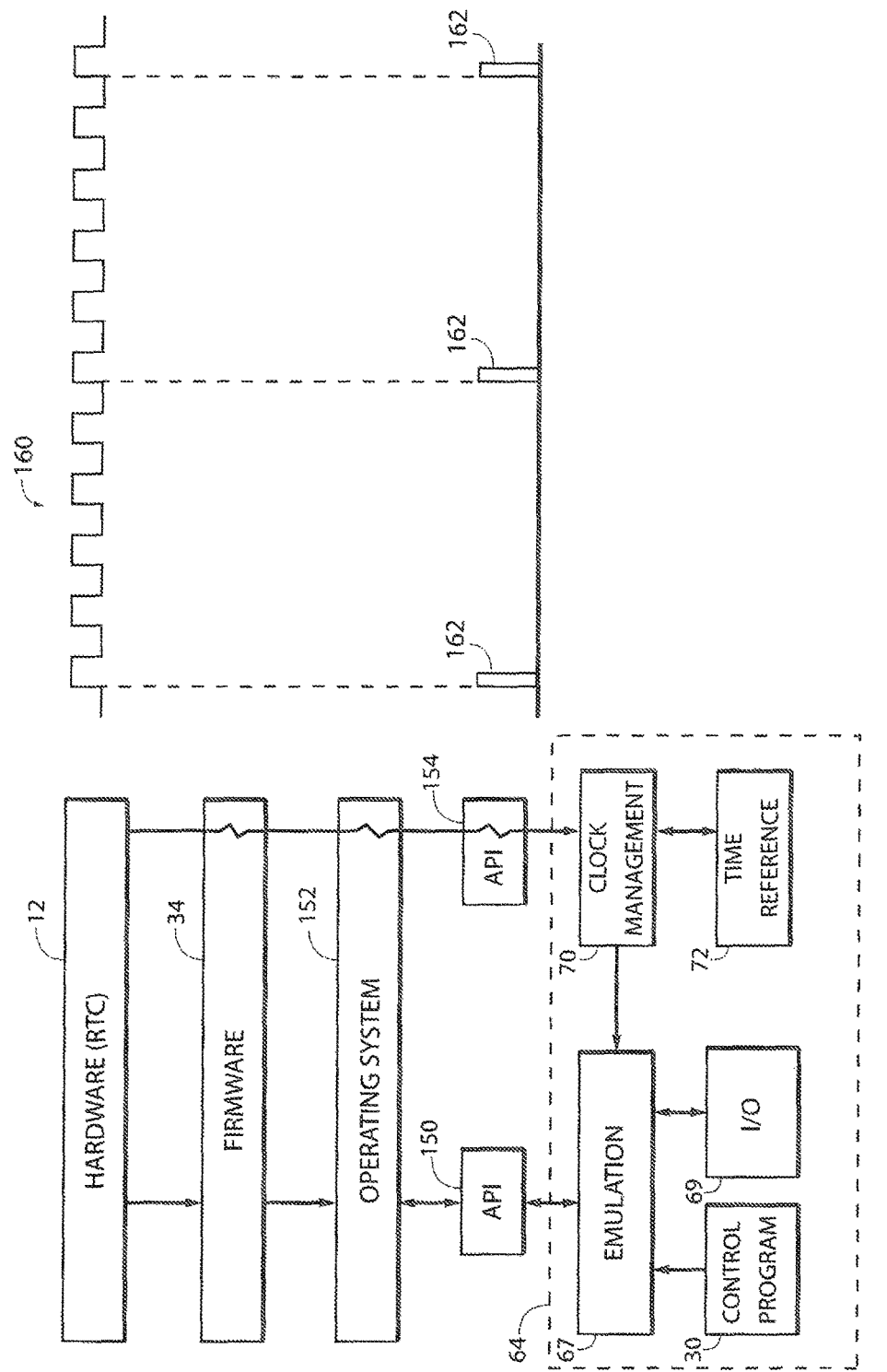

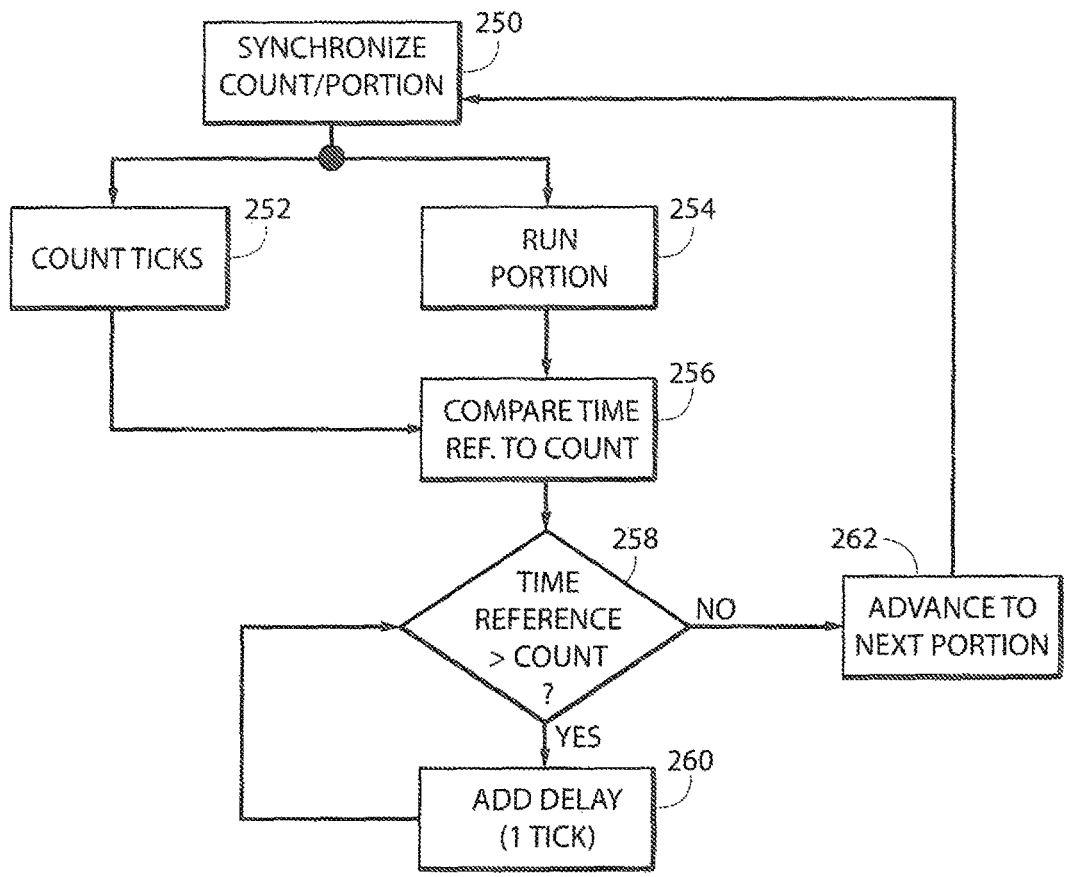

EMULATED INDUSTRIAL CONTROL EXECUTION RATE SCALING

FIELD OF THE INVENTION

The present invention relates to the field of industrial control, and more particularly, to emulation of industrial control devices and improvement of accuracy with respect to such emulation.

BACKGROUND OF THE INVENTION

Industrial controllers are specialized computer systems used for the control of industrial processes or machinery, for example, in a factory environment. Generally, an industrial controller executes a stored control program that reads inputs from a variety of sensors associated with the controlled process or machine and, sensing the conditions of the process or machine, and based on those inputs and a stored control program, calculates a set of outputs used to control actuators controlling the process or machine.

Industrial controllers differ from conventional computers in a number of ways. Physically, they are constructed to be substantially more robust against shock and damage and to better resist external contaminants and extreme environmental conditions than conventional computers. The processors and operating systems are optimized for real-time control and are programmed with languages designed to permit rapid development of control programs tailored to a constantly varying set of machine control or process control applications.

Generally, industrial controllers have a highly modular architecture, for example, that allows different numbers and types of input and output modules to be used to connect the controller to the process or machinery to be controlled. This modularity is facilitated through the use of special "control networks" suitable for highly reliable and available real-time communication. Such control networks (for example, EtherNet/IP, DeviceNet and ControlNet) differ from standard communication networks (such as Ethernet) by guaranteeing maximum communication delays by pre-scheduling the communication capacity of the network, and/or providing redundant communication capabilities for high-availability.

As part of their enhanced modularity, industrial controllers may employ I/O modules or devices dedicated to a particular type of electrical signal and function, for example, detecting input AC or DC signals or controlling output AC or DC signals. Each of these I/O modules or devices may have a connector system allowing them to be installed in different combinations in a housing or rack along with other selected I/O modules or devices to match the demands of the particular application. Multiple or individual I/O modules or devices may be located at convenient control points near the controlled process or machine to communicate with a central industrial controller via the control network.

Adapting an industrial controller to a specialized control task often requires a control program to be customized. For this reason, specialized control languages have been developed that simplify control program development including relay-ladder language (RLL) or structured block programming. These languages may incorporate graphic elements (such as contacts or functional blocks) with text labels and a simplified control-flow to facilitate troubleshooting of the program.

Emulation of industrial control devices is often desirable for logic validation of such devices prior to commissioning. Emulation typically involves replicating the behavior of one or more hardware devices in a software emulation environment executed by a host. The emulation environment is intended to mimic the actual automation hardware as closely as possible. Accordingly, an industrial control system and control program may be tested and validated in a more cost effective virtual environment prior to implementation in an actual physical environment. However, testing in a virtual environment is often configured according to the physical attributes of the host system providing the virtual environment. It is desirable to provide as much as accuracy as feasible in the virtual environment for reflecting results which might be obtained in the physical environment.

SUMMARY OF THE INVENTION

A host system which executes an emulation environment for modelling a logical behavior of an industrial control device may execute a clock management module to scale execution time in the emulation environment to more accurately reflect execution time of the industrial control device. Then clock management module may operate to receive repeatable ticks based on a real time clock of the host system. The repeatable ticks may be used to measure execution of a portion of an industrial control program in the emulation environment, which measure may be compared to a reference value for executing the same portion on the industrial control device. The host system may then temporarily stall execution in the emulation environment to match execution on the industrial control device. Accordingly, the host system may operate to logically reproduce physical execution in an emulation of the physical system by running the emulation at the rate of the physical system so that counters, timers, instructions and the like may be called and/or updated in real time with physical system.

As a result, an emulated industrial control device, such as a controller, may execute a user program (or control program) at the same rate as the physical industrial control device being emulated. As emulated time is advanced in the industrial control device, the user program may be executed at the advanced clock rate. Executing an emulated industrial control device at a modified clock rate may ensure that contents of a user program advances counters, timers, and other user program components at a rate representing true industrial control device program execution using a modified rate.

Aspects of the invention provide not merely advancement or deceleration of time, but a representation of true user program execution rates. Accordingly, user program attributes, such as counters, timers, and the like, may be accurately reflected and updated in real time.

Additional aspects of the invention are further described in co-pending U.S. application Ser. No. 15/001,478, titled "Embedded Emulation Modules in Industrial Control Devices," filed on the same date of the instant application, which document is incorporated herein by reference in its entirety.

Specifically then, one aspect of the present invention may provide a method for modeling an industrial control device including: (a) executing on a host system a program environment stored in a non-transient computer readable medium, the program environment being operable to execute an emulation module configured to model a logical behavior of an industrial control device, wherein the emulation module is configured to execute a second program being an industrial control program; (b) executing a portion of the industrial control program via the emulation module, the portion having multiple program elements including at least one instruction controlling an operation of the industrial control device being modeled; (c) counting a number of periodic ticks in the host system while executing the portion of the industrial control program to determine a host system time; and (d) comparing the host system time to a predetermined execution time, wherein the predetermined execution time indicates a time period for executing the portion of the industrial control program on the industrial control device being modeled.

Another aspect may provide a system for modeling an industrial control device including: a host computer executing a program environment stored in a non-transient computer readable medium, the program environment being operable to execute an emulation module configured to model a logical behavior of an industrial control device, wherein the emulation module is configured to execute a second program being an industrial control program, wherein the host computer is operable to: (a) execute a portion of the industrial control program via the emulation module, the portion having multiple program elements including at least one instruction controlling an operation of the industrial control device being modeled; (b) count a number of periodic ticks generated by the host computer while executing the portion of the industrial control program to determine a host computer time; and (c) compare the host computer time to a predetermined execution time, wherein the predetermined execution time indicates a time period for executing the portion of the industrial control program on the industrial control device being modeled.

These and other features and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which:

FIG. 4 is a simplified diagram illustrating communication flow in a host system for executing a program environment providing emulation with execution rate scaling for accurately reflecting an actual industrial control device being emulated in accordance with an embodiment of the invention;

FIG. 5 is an exemplar time reference which may be used with a clock management module in accordance with an embodiment of the invention; and FIG. 6 is a flow chart illustrating execution rate scaling in a program environment providing emulation in accordance with an embodiment of the invention.

DETAILED DESCRIPTION

Figure 1:
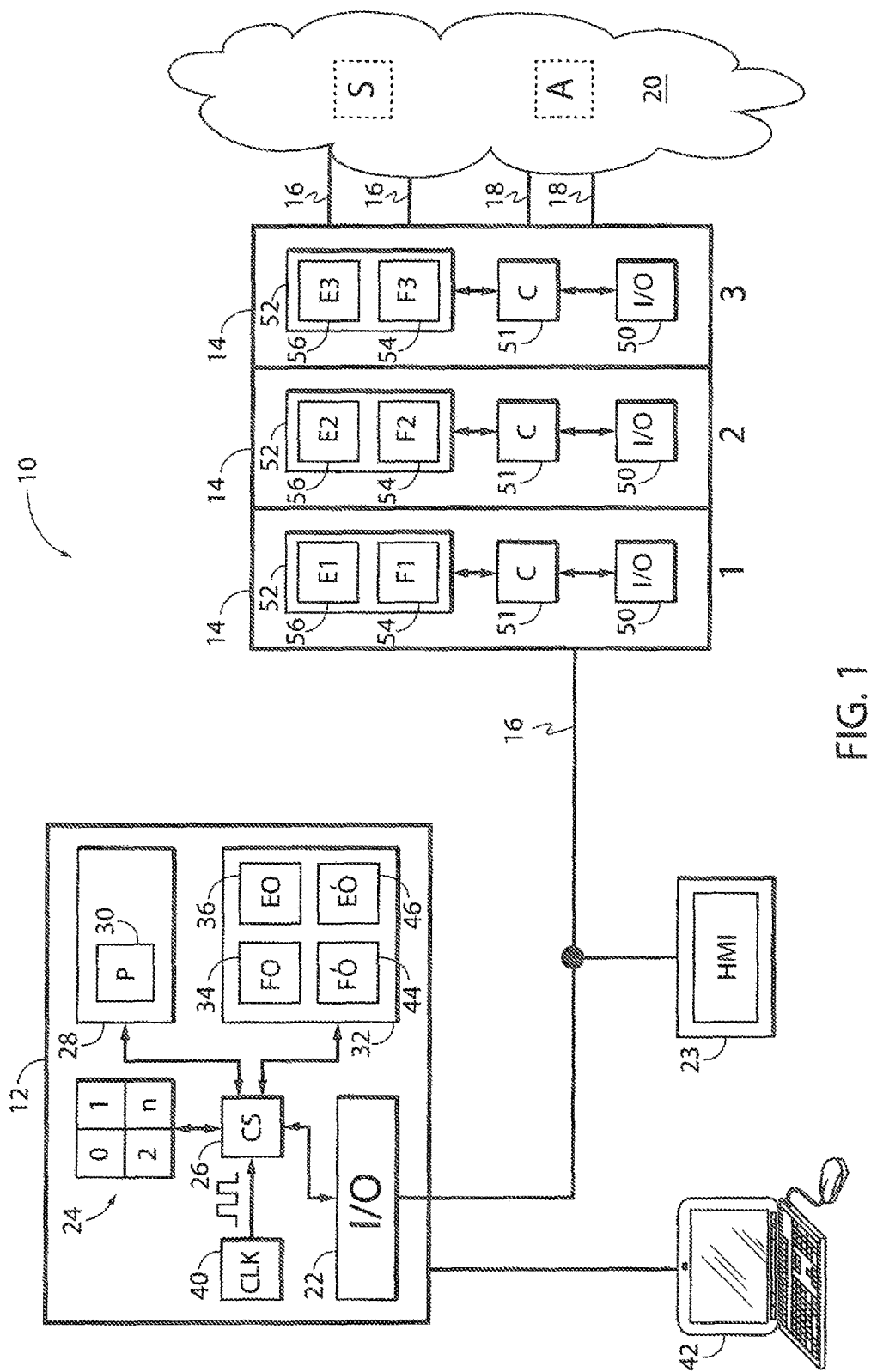
FIG. 1 is a simplified block diagram of an industrial control system in accordance with an embodiment of the invention.

Referring now to FIG. 1, an industrial control system 10 may employ various industrial control devices, such as an industrial controller 12 and one or more industrial control I/O modules 14 in communication with the industrial controller 12 over a high-speed control network 16. The industrial controller 12 may be a Programmable Logic Controller (PLC). The I/O modules 14 (denoted as modules "0," "1" and "2" in FIG. 1), as is understood in the art, may provide for input lines 17 and output lines 18 to industrial equipment 20, the input lines 17 receiving signals from sensors (denoted as "S") associated with the industrial equipment 20 and the output lines 18 providing signals to actuators (denoted as "A") used in the industrial equipment 20.

The industrial controller 12 may utilize a communication interface 22 to communicate over the high-speed control network 16. The industrial controller 12 may also communicate with a Human Machine Interfaces (HMI) 23 over the control network 16, which may display information about the operation of the industrial equipment 20 and its associated process. The high-speed deterministic control network 16, for example, may be a well-known bi-directional control network providing highly reliable and available real-time communication, such as such as DeviceNet, ControlNet or EtherNet/IP type networks.

The industrial controller 12 may include a multicore processor 24 (denoted with processing cores "0," "1," "2" to "n") (controller) which may execute computer readable instructions. The processor 24 may, in turn, communicate with a chipset 26 of the industrial controller 12 or similar logic for communicating with other elements of the system. In one aspect, the chipset 26 may communicate with a non-transient computer readable first memory 28 which may store a control program 30 for controlling the I/O modules 14 and/or the industrial equipment 20, and may communicate with a non-transient computer readable second memory 32 which may store a firmware module 34 (denoted as "F0") and an emulation module 36 (denoted as "E0") as will be further described. The first memory 28 could be, for example, a Dynamic Random Access Memory (DRAM), and may be in communication with a mass storage drive, and the second memory 32 could be, for example, a Flash memory. In alternative aspects, a single memory or several differing memories and types may be used.

The chipset 26 may also communicate with the communication interface 22 for communicating bi-directionally over a physical medium such as the control network 16. The chipset 26 may also receive a clock signal from a real time clock 40, such as a crystal oscillator and related circuitry in the system, for accurately synchronizing events of the industrial controller 12. The industrial controller 12 may also communicate with a workstation 42 or standard programming terminal that may accept user commands, for example, using a keyboard and mouse, and output data, for example depictions of the actual control system and/or emulation of the control system, by a graphics monitor.

The firmware module 34 may be executed by the processor 24 for controlling a logical behavior of the industrial controller 12. The emulation module 36 may be used for modeling a logical behavior of the industrial controller 12 executing the firmware module 34 when executed in an "emulation environment" (or "program environment"). A different firmware module 44 (denoted as "F0'"), which could be an older and/or alternative version to the firmware module 34, and a different emulation module 46 (denoted as "E0'"), which could be older or alternative versions to the firmware module 34 and the emulation module 36, respectively, may also be stored in the second memory 32 or another memory. The emulation module 36 may correspond to the firmware module 34, and the different emulation module 46 may correspond to the different firmware module 44, for example, according to having common revision designators between the respective firmware and emulation modules.

The I/O modules 14 may each include a module communication interface 50 for communicating over a physical medium such as the control network 16. The module communication interface 50 may further allow communication with the industrial equipment 20 via the input lines 17 and the output lines 18. The I/O modules 14 may also include a module controller 51, such a processor, microcontroller or other embedded logic, in communication with the module communication interface 50 and a module memory 53. The module memory 53 may store a firmware module 54, which may be executed by the module controller 51 for controlling a logical behavior of the I/O module 14, and an emulation module 56, which may be used for modeling a logical behavior of the I/O module 14 executing the firmware module 54 when executed in an emulation environment.

In alternative aspects, single or differing memories of the I/O modules 14 may be used, and older and/or alternative versions of the firmware and/or emulation modules may also be stored, similarly to the industrial controller 12. In addition, sensors, actuators, and/or other industrial control devices may be similarly configured with a communication interface, a controller and a stored emulation module for use in the industrial control system 10 as desired.

The control program 30 may generally be made up of program elements such as instructions, variable names, objects and the like. By way of example, the control program 30 may be written in relay ladder language (RLL) comprised of program elements including rungs and various contacts, coils, and function blocks as are generally understood in the art. In other aspects, the control program 30 could be written, for example, in Sequential Function Charts (SFC), structured text. "C" programming, and/or any other technique known in the art.

Figure 2:
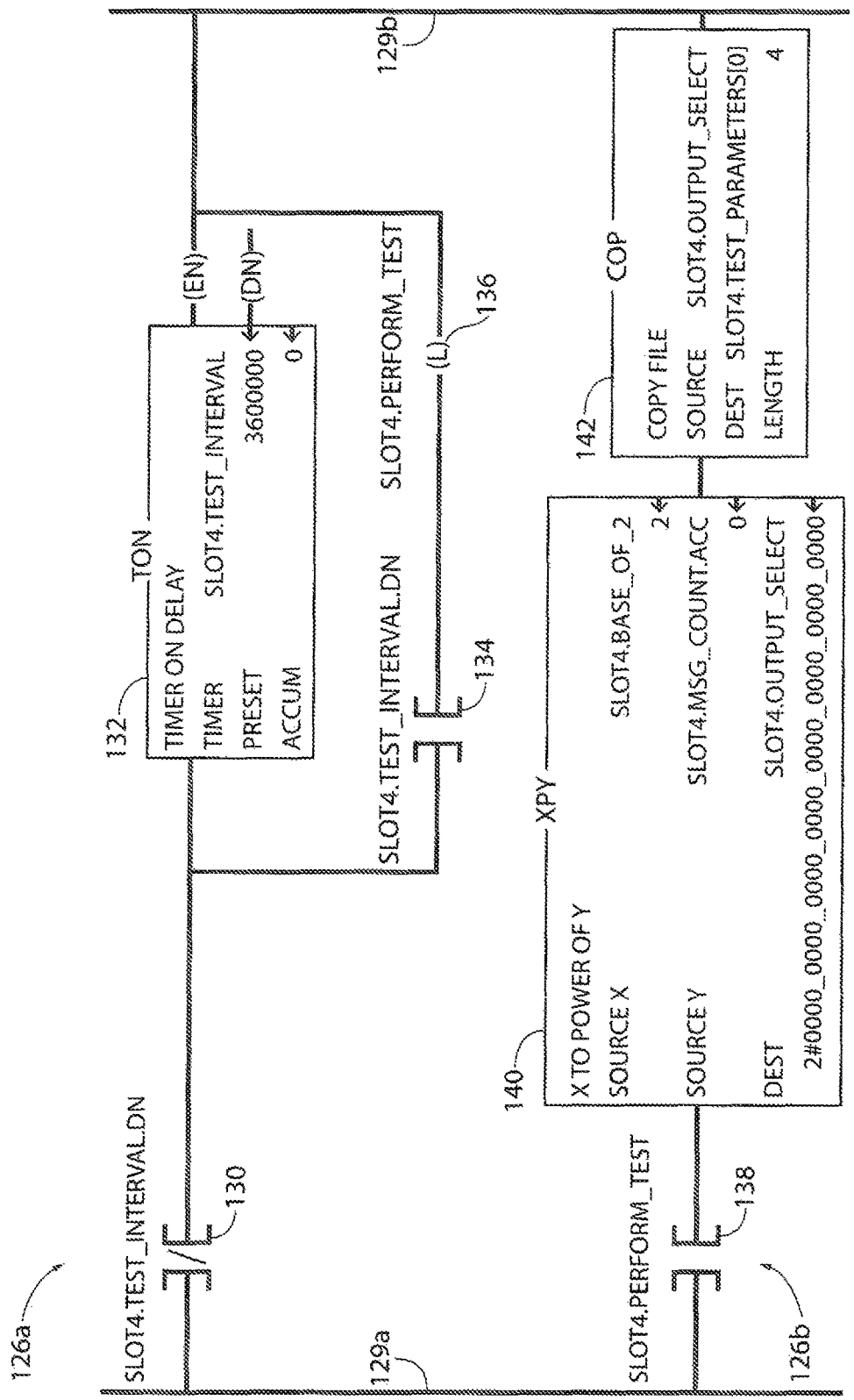
FIG. 2 is an example control program fragment of various rung elements in a relay ladder language (RLL) that may be executed by in the industrial control system of FIG. 1.

Referring momentarily to FIG. 2, by way of example, a fragment of such a control program 30 in RLL that may be executed by in the industrial control system of FIG. 1 is provided. The control program 30, depicted in conventional graphic form, may provide for a first rung 126a and a second rung 126b one above the other and extending between a symbolic positive and ground rails 129a and 129b, respectively, in the manner of the conventional relay structure. In this example, the first rung 126a provides a normally closed (XIO) contact element 130 which when closed may provide power to an on timer 132 (TON) and a series connected normally open contact 134 (XIC) and output coil 136 (OTE), with the latter two connected in parallel with the contact element 130. The second rung 126b provides a normally open contact 138 (XIC) in series with an arithmetic exponentiation block 140 (XPY) and a copy file block 142 (COP).

Figure 3:
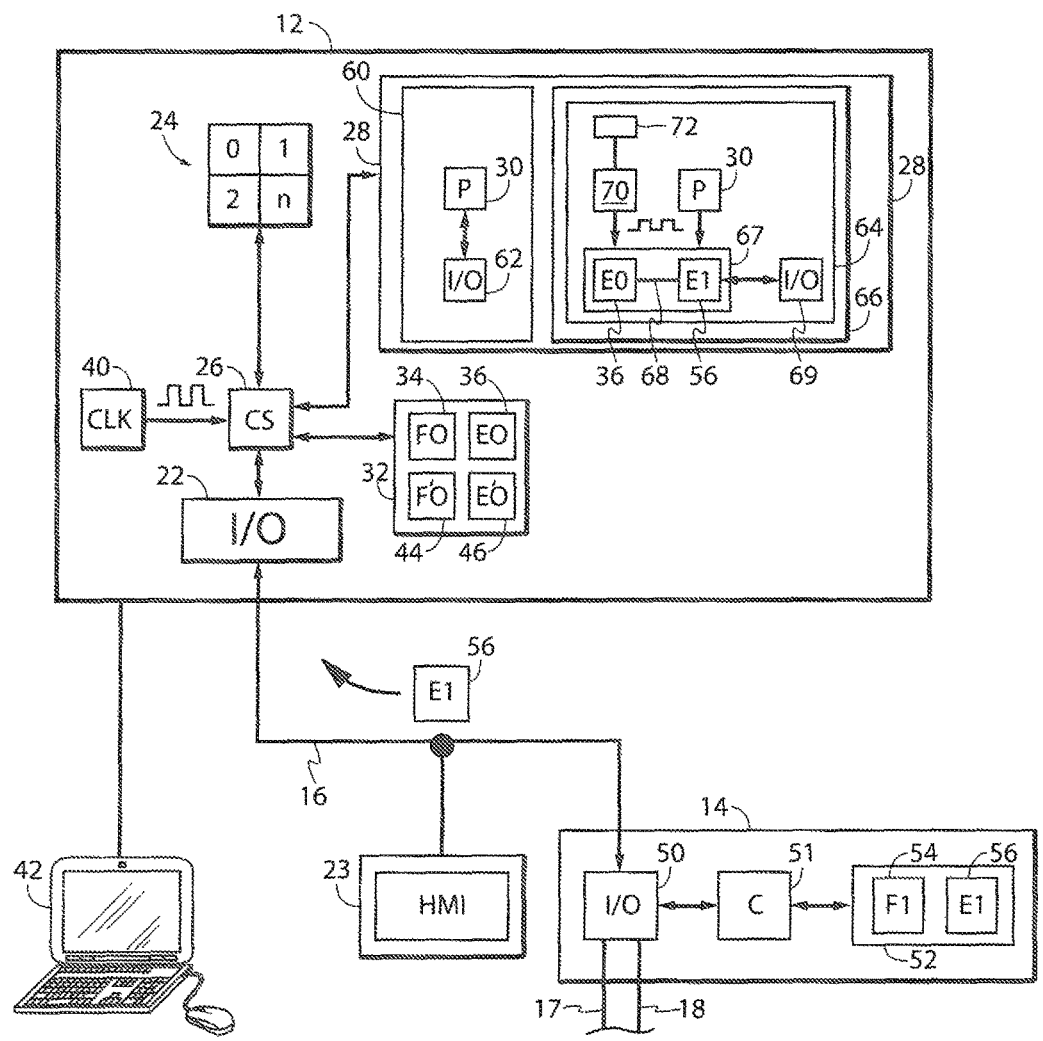
FIG. 3 is a simplified block diagram of an industrial controller hosting an emulation environment by way of example in accordance with an embodiment of the invention.

Referring now to FIG. 3, a simplified block diagram of the industrial controller 12 hosting an emulation environment by way of example is provided in accordance with an embodiment of the invention. An industrial control device, such as an I/O module 14, may transfer a stored emulation module, such as the emulation module 56, via the industrial control device's communication interface to another industrial control device, in this case to the industrial controller 12. The emulation module 56 may be transferred over the control network 16 (or other industry standard communication interface) between the devices in accordance with network protocol. The I/O module 14 may transfer the emulation module 56 to another industrial control device while executing the firmware module 54 for operation of the device and while communicating with the industrial equipment 20 to control an industrial or automation process.

The industrial controller 12 may execute the control program 30, such as via core 0 of the processor 24 executing the control program 30 in a control operating system running in a first area 60 of the first memory 28. Accordingly, the control program 30 may load/store control data 62 in the first area 60 for controlling the I/O module 14 and, in turn, the industrial equipment 20. The control data 62 may include counters, timers, variables and/or instructions generated by actual control of the industrial equipment 20.

Meanwhile, the industrial controller 12, also hosting the system emulation, may further execute to build an emulation environment 64 (or program environment for emulation), such as via core 1 of the processor 24 executing to build the emulation environment 64 in a second operating system running in a second area 66 of the first memory 28. The industrial controller 12 may receive the emulation module 56 from the I/O module 14 and may run the emulation module 56 with its own emulation module 36, with a simulated interconnect 68 in between, as an emulation model 67 in the emulation environment 64. The industrial controller 12 may also provide a copy of the control program 30 in the emulation environment 64 for the emulation module 36 to execute, and may load/store emulated data 69 in the second area 66, analogous to the control data 62 for controlling the I/O module 14 and the industrial equipment 20. The emulated data 69 may receive inputs from the industrial equipment 20, though outputs to the emulated data 69 will typically not provide outputs to the industrial equipment 20

The emulation environment 64 may also include a clock management module 70 in communication with a time reference 72. The clock management module 70 may be in communication with the real time clock 40 of the industrial controller 12, via layers of communication in the industrial controller 12, for receiving repeatable (periodic) ticks or events. The time reference 72 may provide an empirically derived look up table for timing execution of the emulation to match execution of the actual industrial control device and/or industrial control system 10 being modeled.

Accordingly, in one aspect, the emulation environment 64 may execute in lock step (synchronously) with control of the industrial equipment 20. As a result, a parameter, such as a count, time, variable or instruction, updated in the control data 62 may be updated at approximately the same time as an equivalently emulated parameter being updated in the emulated data 69. This may advantageously allow for comparison of the parameters for determining errors in the system.

In another aspect, the emulation environment 64 may advance execution of the emulation environment 64 to be faster than the control of the industrial equipment 20. Accordingly, the emulation environment 64 may provide an output predicting an action (or parameter) of control of the industrial equipment 20, such as a count, time, variable or instruction expected to occur. This may advantageously allow for predicting a possible undesirable outcome or failure, which may allow taking alternative measures to prevent the undesirable outcome or failure.

In yet another aspect, the emulation module 36 (of the industrial controller 12) and the emulation module 56 (of the I/O module 14) may both be transferred to the workstation 42 and/or the HMI 23. Accordingly, the workstation 42 and/or the HMI 23 may host the aforementioned emulation environment, which environment may be in addition to, or alternative to, the emulation environment 64 of the industrial controller 12. The emulation environment 64 may be implemented on a processing core of the industrial controller 12, the workstation 42 and/or the HMI 23 using an instruction set architecture (such as an instruction set architecture suitable for a Microsoft Windows computing platform) that is different from the instruction set architecture implementing the control program 30 in the program environment (such as RLL suitable for industrial control). Accordingly, the same control program 30 used to execute on the physical controller may also be used to execute in the program environment, thereby making this aspect a true emulation and not a simulation.

Referring now to FIG. 4, a simplified diagram illustrating communication flow in a host system or computer, which in this case may be the industrial controller 12, executing a program environment providing emulation is provided. The host system provides execution rate scaling in the program environment providing emulation in accordance with an embodiment of the invention which may accurately reflect execution time of an actual industrial control device being modeled. In alternative aspects, the host system could be the workstation 42 and/or the HMI 23

The emulation environment 64 may be executed on the host system to communicate with an Application Program Interface 150 (API) which, in turn, may communicate with an Operating System 152 (OS) which, in turn, may communicate with the firmware of the host system (such as the firmware module 34) which, in turn, may communicate with the hardware of the host system (such as a processor, chipset, real time clock and other hardware of the industrial controller 12). The emulation environment 64 may execute an emulation model 67 including one or more emulation modules (such as the emulation module 36, the emulation module 56 and/or the simulated interconnect 68) configured to model a logical behavior of an industrial control device, and may execute an industrial control program accordingly (such as the control program 30), as described above with respect to FIG. 3. The emulation environment 64 may also exchange I/O and load/store emulated data 69 as it executes, and receive timing from the clock management module 70, also as described above with respect to FIG. 3.

For scaling execution time in the emulation environment 64, the clock management module 70 may execute in the emulation environment 64 to communicate with the same or different Application Program Interface 154 (API) which, in turn, may communicate with the Operating System 152 (OS) which, in turn, may communicate with the firmware of the host system which, in turn, may communicate with the hardware of the host system, and in particular, the real time clock 40. The real time clock 40 may produce a periodic pulse train clock 160 to hardware elements of the host system as known in the art. By making a call for precise timing information in the system, the clock management module 70 may receive fixed, repeatable, periodic ticks 162 synchronously from the pulse train clock 160; although the periodic ticks 162 will typically be received at a lower frequency than the pulse train clock 160. Such calls may be custom to the host system according to the desired emulation speed/execution ration for an industrial control device being modeled, though in some aspects standardized calls may be used, such as "KeQueryPerformanceCounter," a routine which retrieves a current value and frequency from a performance counter to acquire high resolution (<1 us) time stamps for time interval measurements, as provided by Microsoft Corp. in the Windows Driver Kit (WDK) 10 integrated with Microsoft Visual Studio 2015, or "SetWaitableTimer," a function which activates a specified waitable timer in which, when a due time arrives, the timer is signaled and a thread that set the timer calls an optional completion routine, also provided by Microsoft Corp.

Referring now to FIG. 5, an exemplar time reference 72 which may be used with a clock management module is provided in accordance with an embodiment of the invention. The time reference 72 could be in the form of a look up table or other data structure. The time reference 72 may provide for a specific portion 200 of a program, executing on a specific hardware platform 202, a corresponding predetermined execution time 204 which may be empirically derived from an actual system. The portion 200 may have multiple program elements, including at least one instruction controlling an operation of an industrial control device.

For example, for a first portion of the control program 30 (denoted as "$X_0$"), which may correspond to the first rung 126a of the control program 30 implemented in RLL, entries for hardware platforms "A," "B" and "C" (which might represent, for example, 1756-L60, 1756-L70 and 1756-L80 ControlLogix Controllers by Rockwell Automation, Inc. having different processor speeds, respectively) may have corresponding execution times, such as "2," "2" and "1" (which may be expressed in µs), respectively. These execution times may have been empirically derived from actual industrial control devices executing the portions of the control program 30.

Similarly, for a first portion of the control program 30 (denoted as "$X_1$"), which may correspond to the second rung 126b of the control program 30 implemented in RLL, entries for the same hardware platforms "A," "B" and "C" may have different corresponding execution times, such as "8," "7" and "3," respectively. The time reference 72 may be expanded to cover a multiple portions of a program to be run with execution times for multiple hardware platforms as desired. The size of the portions may be determined according to the predetermined execution times 204 on the actual industrial control devices being within the granularity of the periodic ticks 162 of the host system.

In addition, a log 206 may be maintained in the time reference 72. The log may be used by the clock management module 70 to record actual execution times of respective portions on the host system, which may be used for subsequent tuning and adjustment of the time reference 72.

Referring now to FIG. 6, a flow chart illustrating execution rate scaling in a program environment providing emulation is provided in accordance with an embodiment of the invention. In block 250, a host system executes a program environment operable to execute an emulation module configured to model a logical behavior of an industrial control device. The emulation module may be configured to execute an industrial control program, which may be an RLL program. The host system may synchronize execution of a portion of the control program with a count provided by a clock management module communicating with a real time clock of the host system. The portion may have multiple program elements, including at least one instruction controlling an operation of an industrial control device being modeled.

Next, in block 252, the host system, via the clock management module, may count a number of periodic ticks in the host system while, in block 254, the host system executes the portion of the control program. Accordingly, the host system determines a host system time based on the number of periodic ticks counted to execute the portion.

Next, in block 256, the host system compares the host system time to a predetermined execution time, which may be provided by a time reference. The predetermined execution times may indicate time periods for executing the portion of the control program on various hardware platforms, including the industrial control device being modeled.

In decision block 258, the host system determines whether the predetermined execution time for the portion of the control program executed for the hardware platform being modeled is greater than the host system time (count of periodic ticks). If the predetermined execution time is greater than the host system time, in block 260 the host system may add delay, preferably 1 tick at a time. After adding the delay, the host system returns to the decision block 258 again to compare the predetermined execution time with the host system time and the added delay. If the predetermined execution time is still greater than the host system time, the host system may return again to block 260 to add further delay, preferably another tick. This may continue in a loop until the predetermined execution time is no longer greater than the host system time, and is preferably equal to the host system time.

In the decision block 258, if the predetermined execution time is not greater than the host system time, then the host system may continue to block 262 to advance to a subsequent portion of the control program for execution. From block 262, the host system may return to block 250, in which the host system may synchronize execution of the subsequent portion of the control program with a new count (reset to zero). This may continue in a loop as the control program is being executed.

As a result, in one aspect, the emulation environment may be executed in lock step (synchronously) with control of industrial equipment. Accordingly, a parameter, such as a count, time, variable or instruction, may be updated in the industrial control system at approximately the same time as an equivalently emulated parameter being updated in the emulation environment. This may advantageously allow for comparison of the parameters for determining errors in the system.

Certain terminology is used herein for purposes of reference only, and thus is not intended to be limiting. For example, terms such as "upper," "lower," "above," and "below" refer to directions in the drawings to which reference is made. Terms such as "front," "back," "rear," "bottom," "side," "left" and "right" describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first," "second" and other such numerical terms referring to structures do not imply a sequence or order unless clearly indicated by the context.

When introducing elements or features of the present disclosure and the exemplary embodiments, the articles "a," "an," "the" and "said" are intended to mean that there are one or more of such elements or features. The terms "comprising," "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

The controller described above may be a microprocessor, a microcontroller or other programmable logic element as known the art. References to "a microprocessor" and "a processor" or "the microprocessor" and "the processor" can be understood to include one or more microprocessors that can communicate in a stand-alone and/or a distributed environment(s), and can thus be configured to communicate via wired or wireless communications with other processors, where such one or more processors can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and/or can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as coming within the scope of the following claims. All of the publications described herein including patents and non-patent publications are hereby incorporated herein by reference in their entireties.

What is claimed is:

1. A method for modeling an industrial control device comprising:
   (a) executing on a host system a program environment stored in a non-transient computer readable medium, the program environment being operable to execute an emulation module defining a model for a logical behavior of an industrial control device, wherein the emulation module permits execution of a second program being an industrial control program;
   (b) executing a portion of the industrial control program via the emulation module, the portion having multiple program elements including at least one instruction controlling an operation of the industrial control device being modeled;
   (c) counting a number of periodic ticks synchronous with a clock in the host system while executing the portion of the industrial control program using the emulation module to determine a host system time for execution of the portion of the industrial control program on the host system using the emulation module; and
   (d) comparing the host system time to a predetermined execution time stored in a data structure of the host system, wherein the predetermined execution time indicates a time period for executing the portion of the industrial control program on the industrial control device being modeled.

2. The method of claim 1, further comprising adding a delay before executing a subsequent portion of the industrial control program.

3. The method of claim 2, further comprising adding the delay when the host system time is less than the predetermined execution time.

4. The method of claim 1, further comprising implementing the industrial control program using an instruction set architecture that is different from an instruction set architecture for implementing the program environment.

5. The method of claim 4, wherein the industrial control program is implemented using relay-ladder language (RLL).

6. The method of claim 1, further comprising storing the predetermined execution time in a table comprising a plurality of predetermined execution times for different portions of an industrial control program.

7. The method of claim 1, further comprising storing the predetermined execution time in a table comprising a plurality of predetermined execution times for different industrial control devices.

8. The method of claim 1, wherein the host system is a workstation connected to an industrial control device, and further comprising the industrial control device executing the industrial control program.

9. The method of claim 1, wherein the host system is a Human Machine Interface (HMI) connected to an industrial control device, and further comprising the industrial control device executing the industrial control program.

10. The method of claim 1, wherein the host system is the industrial control device, and further comprising executing the program environment and the emulation module on a first processing core of the host system while executing the industrial control program on a second processing core of the host system.

11. A system for modeling an industrial control device comprising:
  a host computer executing a program environment stored in a non-transient computer readable medium, the program environment being operable to execute an emulation module defining a model for a logical behavior of an industrial control device, wherein the emulation module permits execution of a second program being an industrial control program, wherein the host computer is operable to:
  (a) execute a portion of the industrial control program via the emulation module, the portion having multiple program elements including at least one instruction controlling an operation of the industrial control device being modeled;
  (b) count a number of periodic ticks synchronous with a clock generated by the host computer while executing the portion of the industrial control program using the emulation module to determine a host computer time for execution of the portion of the industrial control program on the host computer using the emulation module; and
  (c) compare the host computer time to a predetermined execution time stored in a data structure of the host computer, wherein the predetermined execution time indicates a time period for executing the portion of the industrial control program on the industrial control device being modeled.

12. The system of claim 11, wherein the host computer is further operable to add a delay before executing a subsequent portion of the industrial control program.

13. The system of claim 12, wherein the delay is added when the host computer time is less than the predetermined execution time.

14. The system of claim 11, wherein the industrial control program is configured to execute on an industrial control device implementing an instruction set architecture that is different from an instruction set architecture for implementing the program environment.

15. The system of claim 14, wherein the industrial control program is implemented using relay-ladder language (RLL).

16. The system of claim 11, wherein the host computer is further operable to store the predetermined execution time in a table comprising a plurality of predetermined execution times for different portions of an industrial control program.

17. The system of claim 11, wherein the host computer is further operable to store the predetermined execution time in a table comprising a plurality of predetermined execution times for different industrial control devices.

18. The system of claim 11, wherein the host computer is a workstation, and wherein the workstation is connected to an industrial control device executing the industrial control program.

19. The system of claim 11, wherein the host computer is a Human Machine Interface (HMI), and wherein the HMI is connected to an industrial control device executing the industrial control program.

20. The system of claim 11, wherein the host computer is the industrial control device, and further comprising first and second processing cores of the host computer, wherein the first processing core executes the program environment and the emulation module while the second processing core executes the industrial control program.

* * * * *